(12) United States Patent
Yang et al.

(10) Patent No.: US 10,339,080 B2
(45) Date of Patent: Jul. 2, 2019

(54) SYSTEM AND METHOD FOR OPERATING THE SAME

(71) Applicant: SK hynix Inc., Gyeonggi-do (KR)

(72) Inventors: Hyung-Gyun Yang, Gyeonggi-do (KR); Yong-Ju Kim, Gyeonggi-do (KR); Yong-Kee Kwon, Gyeonggi-do (KR); Hong-Sik Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 433 days.

(21) Appl. No.: 15/188,347

(22) Filed: Jun. 21, 2016

(65) Prior Publication Data
US 2017/0220497 A1    Aug. 3, 2017

(30) Foreign Application Priority Data

Feb. 2, 2016    (KR) .......................... 10-2016-0012661

(51) Int. Cl.
| | | |
|---|---|---|
| *G06F 13/28* | (2006.01) | |
| *G06F 12/02* | (2006.01) | |
| *G06F 13/42* | (2006.01) | |
| *G11C 7/10* | (2006.01) | |

(52) U.S. Cl.
CPC .......... *G06F 13/28* (2013.01); *G06F 12/0246* (2013.01); *G06F 13/4282* (2013.01); *G11C 7/1072* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 5,584,041 A | * | 12/1996 | Odawara ............... | G06F 13/124 710/14 |
| 2006/0047914 A1 | * | 3/2006 | Hofmann ................ | G06F 9/383 711/137 |
| 2014/0149637 A1 | | 5/2014 | Gu et al. | |
| 2016/0092351 A1 | * | 3/2016 | Uematsu ............. | G06F 12/0246 711/103 |
| 2016/0267027 A1 | * | 9/2016 | Fujisawa ............. | G06F 13/1668 |

FOREIGN PATENT DOCUMENTS

KR    1020140071135    6/2014

* cited by examiner

Primary Examiner — Idriss N Alrobaye
Assistant Examiner — Dayton Lewis-Taylor
(74) Attorney, Agent, or Firm — IP & T Group LLP

(57) ABSTRACT

A system includes a central processing unit (CPU); main and auxiliary storage devices coupled to a plurality of memory ports; a memory bus suitable for coupling the CPU and the plurality of memory ports; and a memory controller suitable for, when the CPU calls data stored in the auxiliary storage device, controlling the called data to be transferred from the auxiliary storage device to the main storage device and stored in the main storage device.

19 Claims, 9 Drawing Sheets

SYSTEM AND METHOD FOR OPERATING THE SAME

CROSS-REFERENCE TO RELATED APPLICATION

This application claims priority under 35 U.S.C. § 119(a) to Korean Patent Application No. 10-2016-0012661 filed on Feb. 2, 2016 in the Korean Intellectual Property Office, which is incorporated herein by reference in its entirety.

TECHNICAL FIELD

Exemplary embodiments relate to a system and a method for operating the same.

DISCUSSION OF THE RELATED ART

FIG. 1 is a schematic diagram showing a configuration of a conventional memory system. FIG. 2 is a diagram showing a route on which data is transferred to a central processing unit (CPU) 110 from a disk device 190 in the system of FIG. 1.

Referring to FIG. 1, the system includes the CPU 110, a cache memory 120, a memory bus 130, a direct memory access (DMA) controller 140, a memory controller 150, a memory device 160, a peripheral component interconnect (PCI) bus 170, a disk controller 180 and the disk device 190.

As a device to control the entire system, the CPU 110 controls and adjusts a series of processes to receive and process data from various input devices (not shown in FIG. 1) and then outputs a result of the data processing to an output device. If necessary, the CPU 110 may store the data in the memory device 160 or the disk device 190, or use the data stored in the memory device 160 or the disk device 190.

The cache memory 120, as a high-speed memory device in a buffer type which is filled with instructions and programs read out from a main storage device (i.e., the memory device 160 in FIG. 1), is disposed between the memory device 160 and the CPU 110.

When a program is executed by the CPU 110, the memory device 160 acts as a main storage device of the system, to which the program or data may be moved from an auxiliary storage device for execution. There are two types of memories, one of which is a read-only memory (ROM) to retain stored data even when power is cut off and the other of which is a random access memory (RAM) of a volatile memory type in which all data are erased when power is cut off. The RAM is classified into an SRAM (static RAM) and a DRAM (dynamic RAM). The SRAM retains stored data while power is supplied thereto, and the DRAM retains stored data only when a refresh operation is performed cyclically even though power is supplied. The DRAM is mainly used for a mass storage device.

As a memory device to store a program or data outside the CPU 110, the disk device 190 is slower than a main storage device, but can store a lot of data permanently. In general, as an auxiliary storage device, there are storage devices to use magnetic properties such as a magnetic tape and a magnetic disk, to use light properties such as a laser disk, or to use these two properties such as an optical magnetic disk. A floppy disk, a hard disk, a CD-ROM and so on mainly used in a personal computer may serve as an auxiliary storage device.

Hereinafter, referring to FIG. 2, in the case where data stored in the disk device 190 is called by the CPU 110, the process of transferring the data from the disk device 190 to the CPU 110 in the conventional system will be described.

When the CPU 110 calls data stored in the disk device 190, the data of the disk device 190 is first transferred to the DMA controller 140 by the disk controller 180 via the PCI bus 170 (①). Next, the data which is transferred from the disk device 190 is transferred to the memory controller 150 by the DMA controller 140 via the memory bus 130, and then the transferred data is stored in the memory device 160 under the control of the memory controller 150 (②). The data stored in the memory device 160 is transferred to the CPU 110 under the control of the memory controller 150 (③).

FIG. 3 is a flowchart of the data transfer process of FIG. 2.

Referring to FIG. 3, various processing steps, such as a data request step (S310), a DMA controller request step (S320), a bus request step (S330), a bus grant step (S340), a disk device-to-memory device transfer step (S350), a completion signal generation step (S360) and a memory device-to-CPU transfer step (S370) may be involved in order to call the data stored in the disk device 190.

The data request step (S310) may represent a step in which the CPU 110 transfers a data calling instruction to the disk controller 180. The DMA controller request step (S320) may represent a step in which the disk controller 180 calls the DMA controller 140 in response to the data calling instruction. The bus request step (S330) may represent a step in which the DMA controller 140 requests a grant to the CPU 110 for use of the PCI bus 170 and the memory bus 130. The bus grant step (S340) may represent a step in which the CPU 110 grants a request to the DMA controller 140 to use the PCI bus 170 and the memory bus 130. The disk device-to-memory device transfer step (S350) may represent a step in which the DMA controller 140 controls data transfer such that the data stored in the disk device 190 is transferred to the memory device 160 via the PCI bus 1170 and the memory bus 130 after receiving the grant for use of the PCI bus 170 and the memory bus 130.

The completion signal generating step (S360) may represent a step in which the DMA controller 140 notifies the CPU 110 that all the data stored in the disk device 190 and requested by the CPU 110 are transferred to the memory device 160. The memory device-to-CPU transfer step (S370) may represent a step in which the data stored in the memory device 160 is transferred to the CPU 110 by the memory controller 150 via the memory bus 130.

Referring to FIGS. 2 and 3, in the case where the CPU 110 calls the data stored in the disk device 190 in the conventional system, the data transfer process and route of the called data are complex, thereby lowering the processing speed of the called data, and wasting the bandwidth of the memory bus 130 and the PCI bus 170.

SUMMARY

Various embodiments are directed to a system capable of quickly and easily transferring data which is requested from a CPU, by using main and auxiliary storage devices coupled to a plurality of memory ports and simplifying data transfer between the main and auxiliary storage devices.

In an embodiment, a system may include: a central processing unit (CPU); main and auxiliary storage devices coupled to a plurality of memory ports; a memory bus suitable for coupling the CPU and the plurality of memory ports; and a memory controller suitable for, when the CPU calls data stored in the auxiliary storage device, controlling the called data to be transferred from the auxiliary storage device to the main storage device and stored in the main storage device.

In an embodiment, a method for operating a system including a central processing unit (CPU), and main auxiliary storage device coupled to a plurality of memory ports may include: transferring an instruction to call data which is stored in the auxiliary storage device, by the CPU; transferring and storing the called data of the auxiliary storage device to and in the main storage device, in response to the transferred instruction; and transferring a completion signal to the CPU when the storing of the called data in the main storage device is completed.

In an embodiment, a system may include: main and auxiliary storage devices; and a memory controller coupled to the main and auxiliary storage device via a plurality of memory ports and suitable for reading and writing data from and to the main and auxiliary storage devices, wherein when data stored in the auxiliary storage device is called, the memory controller controls the called data to be transferred from the auxiliary storage device to the main storage device via the memory ports and to be stored in the main storage device.

DETAILED DESCRIPTION

Figure 1:
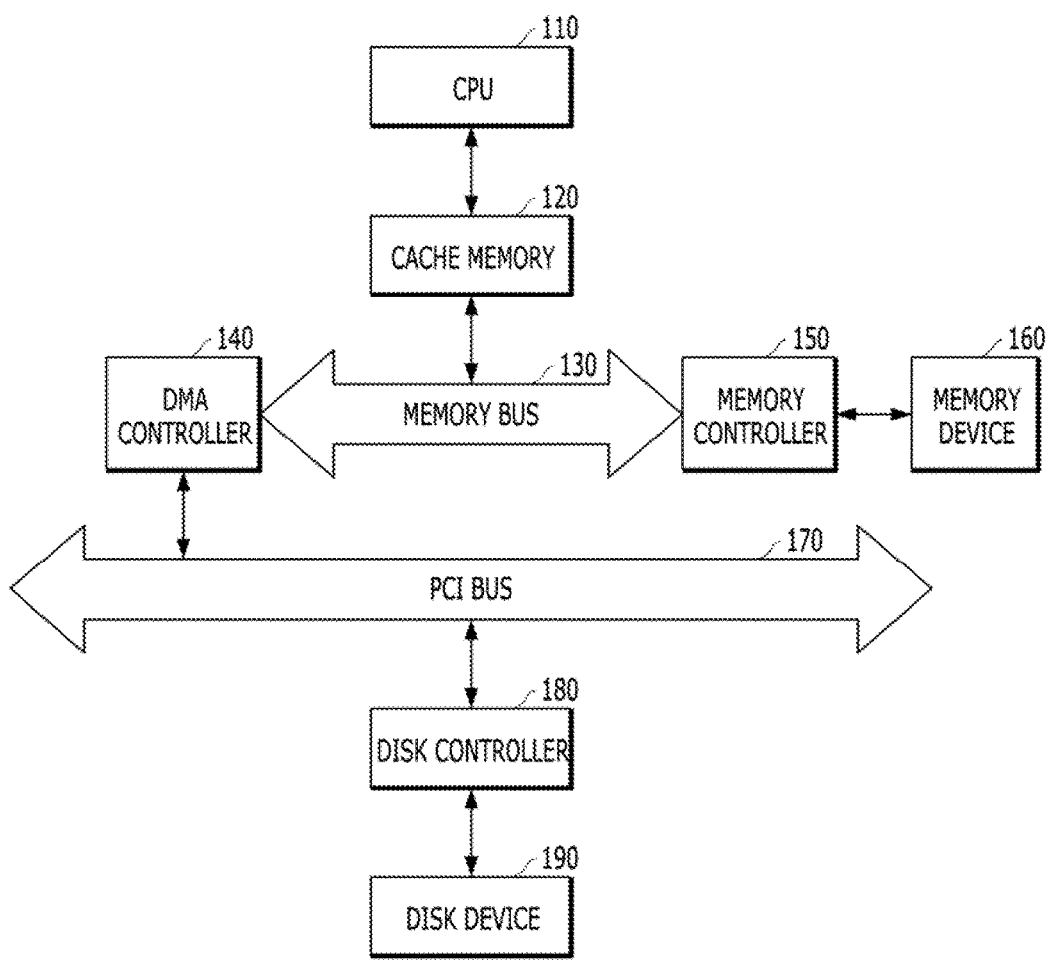
FIG. 1 is a schematic diagram showing a configuration of a conventional system.
Figure 2:
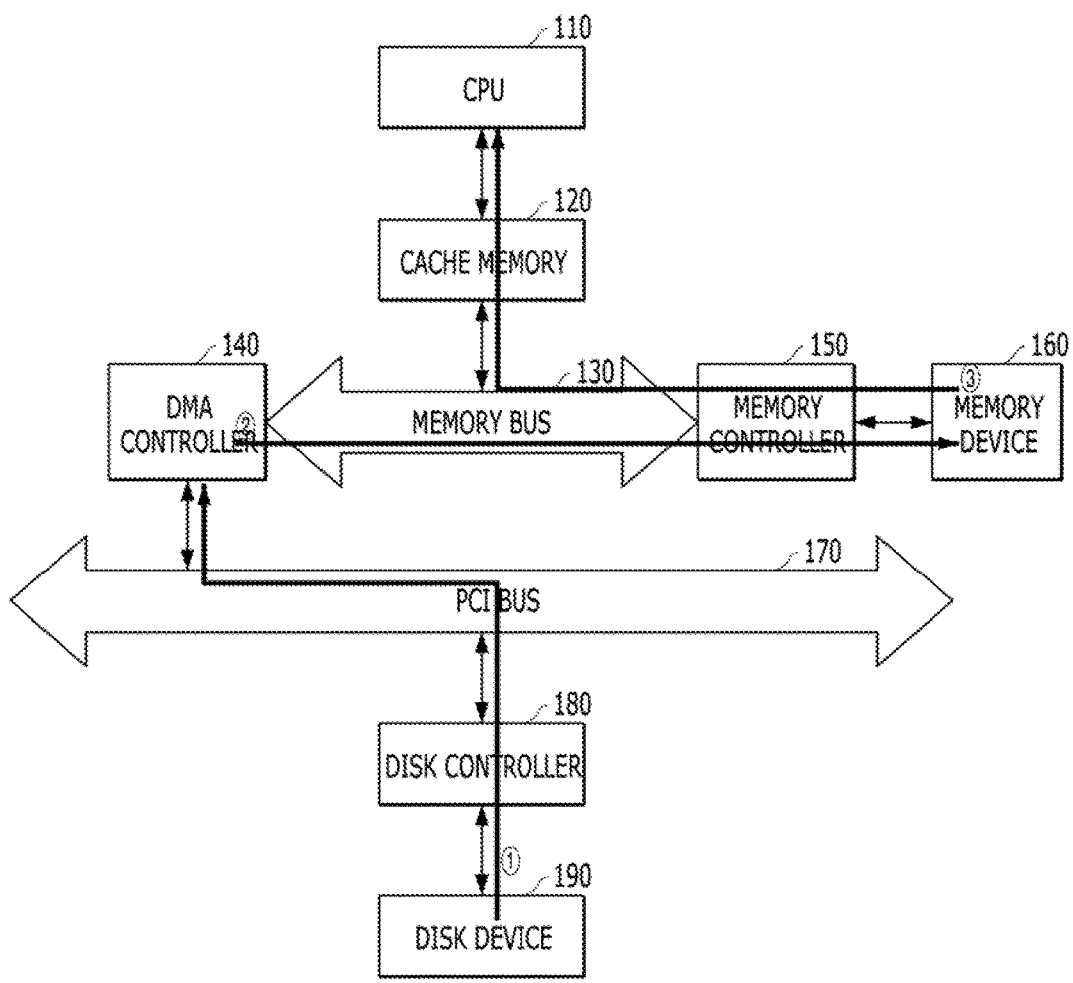
FIG. 2 is a diagram showing a route on which data is transferred to a central processing unit (CPU) from a disk device in the system of FIG. 1.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

The present invention may have diverse modifications and embodiments, and herein, some of the embodiments are taken as examples to describe the present invention. Hence, as it would be apparent to those skilled in the art to which this invention pertains, the described embodiments are not intended to limit the scope of the present invention. Also, the constituent elements of the embodiments of the present invention should be understood to include all modifications, substitutes and equivalents. In this respect, the following embodiments shown in FIGS. 1 to 9 which are used to describe the present Invention should be construed not to be restrictive but to be illustrative.

It will be also understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in detail with reference to the attached drawings.

Figure 4:
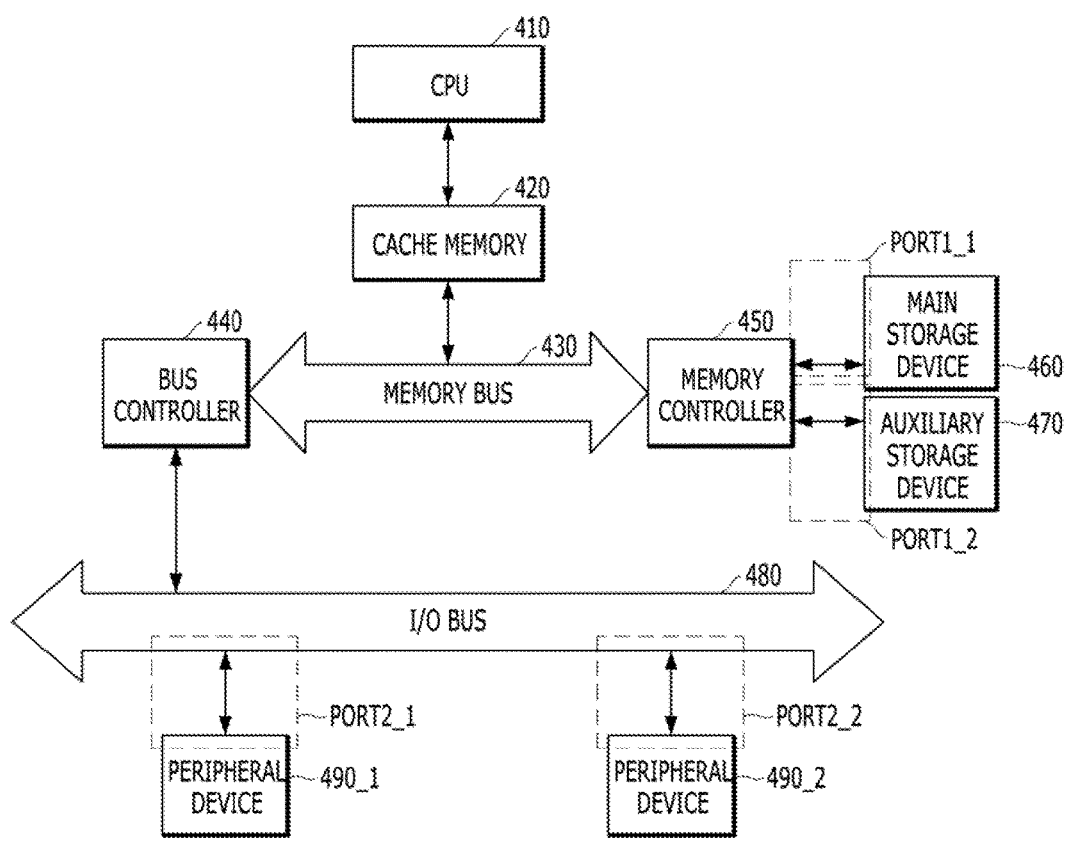
FIG. 4 is a block diagram illustrating a configuration of a system, according to an embodiment of the present invention.

Referring now to FIG. 4 a configuration of a system is provided, according to an embodiment of the present invention.

According to the embodiment of FIG. 4, the system may include a central processing unit (CPU) 410, a cache memory 420, a memory bus 430, a bus controller 440, a memory controller 450, a main storage device 460, an auxiliary storage device 470, an input/output (I/O) bus 480, peripheral devices 490_1 and 490_2, a plurality of memory ports PORT1_1 and PORT1_2, and a plurality of I/O ports PORT2_1 and PORT2_2. Although, in the embodiment of FIG. 4, two peripheral devices 490_1 and 490_2 are illustrated as an example, it is noted that in other embodiments one or more peripheral devices may be employed without departing from the scope of the present invention.

The memory bus 430 may transfer data between the I/O bus 480 and the main storage device 460 through the bus controller 440, for example through a relay of the bus controller 440. The memory bus 430 may also transfer data between the CPU 410 and the main storage device 460 through the memory controller 450, for example, through a relay of the memory controller 450. The memory bus 430 may be a high-speed channel to transfer data between the CPU 410 and the main and auxiliary storage devices which are coupled to the memory ports PORT1_1 and PORT1_2. Any suitable high speed channel may be employed.

The bus controller 440 may control an operation of transferring data outputted from the peripheral devices 490_1 and 490_2 to the main storage device 460 when the CPU 410 calls the data of the peripheral devices 490_1 and 490_2. The bus controller 440 may execute a bus request issued by the CPU 410, and transfer the data outputted from the peripheral devices 490_1 and 490_2 to the main storage device 460 via the I/O bus 480 and the memory bus 430. The memory controller 450 may control an operation of the main storage device 460 and/or the auxiliary storage device 470 according to a request from the CPU 410 or the bus controller 440. The operation of the main storage device 460 or the auxiliary storage device 470 may include, for example, a write operation or a read operation.

The main storage device 460 may be a storage unit to and in which a program and/or data from an auxiliary storage device may be transferred and executed when the program and/or data is executed by the CPU 410. The main storage device 460 may be a ROM in which the stored data is retained even when power is cut off or a RAM of a volatile memory type in which all stored data are lost when power is cut off. The main storage device of FIG. 4 may be a dual in-line memory module (DIMM).

As a storage unit to store a program or data outside the CPU 410, the auxiliary storage device 470 may store a lot of data permanently even through its data processing speed is low. The auxiliary storage device 470 may be a magnetic tape, a magnetic disk, a laser disk, an optical magnetic disk, a floppy disk, a hard disk, a CD-ROM, and the like.

The auxiliary storage device 470 shown in FIG. 4, unlike a conventional auxiliary storage device, it is coupled to a memory port, for example, the memory port PORT1_2. The auxiliary storage device 470 may have a flash memory chip, instead of a DRAM chip, in a DIMM. The auxiliary storage device 470 of FIG. 4 may be a storage channel memory that is capable of being used by being coupled to the memory port PORT1_2.

In general, the main storage device 460 may have a faster operating speed and a shorter latency as a waiting time than the auxiliary storage device 470. On the contrary, the auxiliary storage device 470 may have a slower operating speed and a longer latency than the main storage device 460.

The I/O bus 480 may transfer data between the memory bus 430 and the peripheral devices 490_1 and 490_2 through the relay of the bus controller 440. The I/O bus 480 may be a PCI bus.

The peripheral devices 490_1 and 490_2 may include various devices, such as, for example, a graphic processing unit to process graphic data of the system and a communication device for networking with other systems which transmit instructions into the system and receive a processing result of the system.

Each of the memory ports PORT1_1 and PORT1_2, may include slots of a predetermined form for coupling a corresponding memory device, which has a connector that is compatible with the slots, to the system. As illustrated in FIG. 4, the memory device coupled to the memory ports PORT1_1 and PORT1_2 may be the main storage device 460 and the auxiliary storage device 470, respectively. The I/O ports PORT2_1 and PORT2_2, may include slots of a predetermined form for coupling the peripheral devices 490_1 and 490_2, which have a connector compatible with the slots, to the system.

In a variation of the embodiment of FIG. 4, the system shown in FIG. 4 may employ, as the auxiliary storage device 470, a storage channel memory which is coupled to one of the memory ports PORT1_1 and PORT1_2, instead of using a disk device coupled to the I/O ports PORT2_1 and PORT2_2 to transfer data via the PCI bus 480. In such a configuration, the memory controller 450 in the system of FIG. 4 may perform the functions of a DMA controller.

Hereinafter, referring to FIG. 5, a process of transferring data stored in the auxiliary storage device 470 to the CPU 410 in the system of FIG. 4 will be described.

Figure 5:
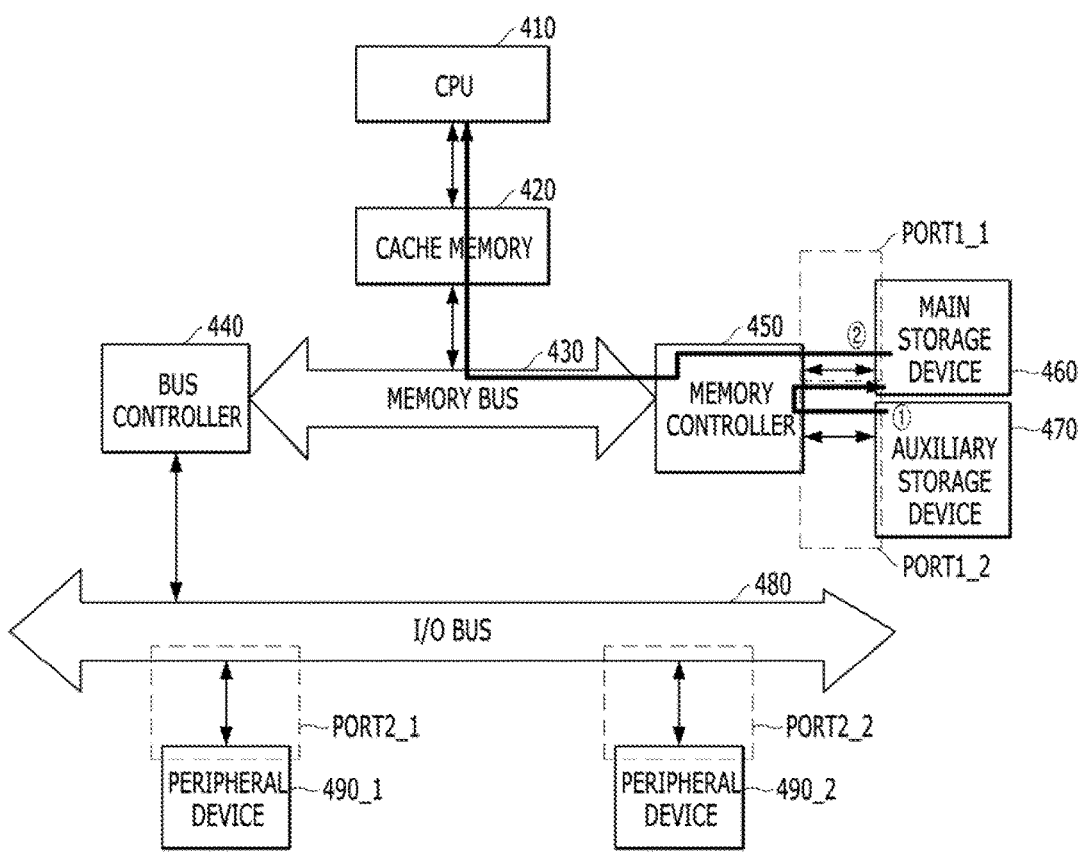
FIG. 5 is a block diagram illustrating a data transfer route from an auxiliary storage device to a CPU in the system of FIG. 4.

FIG. 5 is a block diagram illustrating a data transfer route from the auxiliary storage device 470 to the CPU 410 in the system of FIG. 4.

Referring to FIG. 5, when the CPU 410 calls data of the auxiliary storage device 470, an instruction for calling the data of the auxiliary storage device 470 is transferred to the memory controller 450, and the data of the auxiliary storage device 470 is transferred to and stored in the main storage device 460 under the control of the memory controller 450 (①). Prior to the transfer of data from the auxiliary storage device 470 to the main storage device, a storage space is allocated in the main storage device 460 for receiving the data to be transferred from the auxiliary storage device 470.

When the operation of transferring the data of the auxiliary storage device 470 to the main storage device 460 following the request from the CPU 410 is completed, the memory controller 450 may then transfer to the CPU 410 a completion signal COMPLETE (see FIG. 6) which indicates the completion of the data transfer. When the completion signal is received by the CPU, the CPU 410 may then receive and use the requested data by accessing the main storage device 460 (②).

Hence, the system of FIG. 4 does not employ the buses 430 and 480 when the data of the auxiliary storage device 470 is transferred to the main storage device 460 following a request by the CPU 410. The system uses the memory controller 450 for the data transfer. The system of FIG. 4 transfers the data of the auxiliary storage device 470 to the main storage device 460 without using the bus, thereby reducing bandwidth loss. Also, the operating speed of the system may be increased by reducing the length between the auxiliary storage device 470 and the main storage device 460 and by simplifying the data transfer process from the auxiliary storage device 470 to the main storage device 460.

Figure 6:
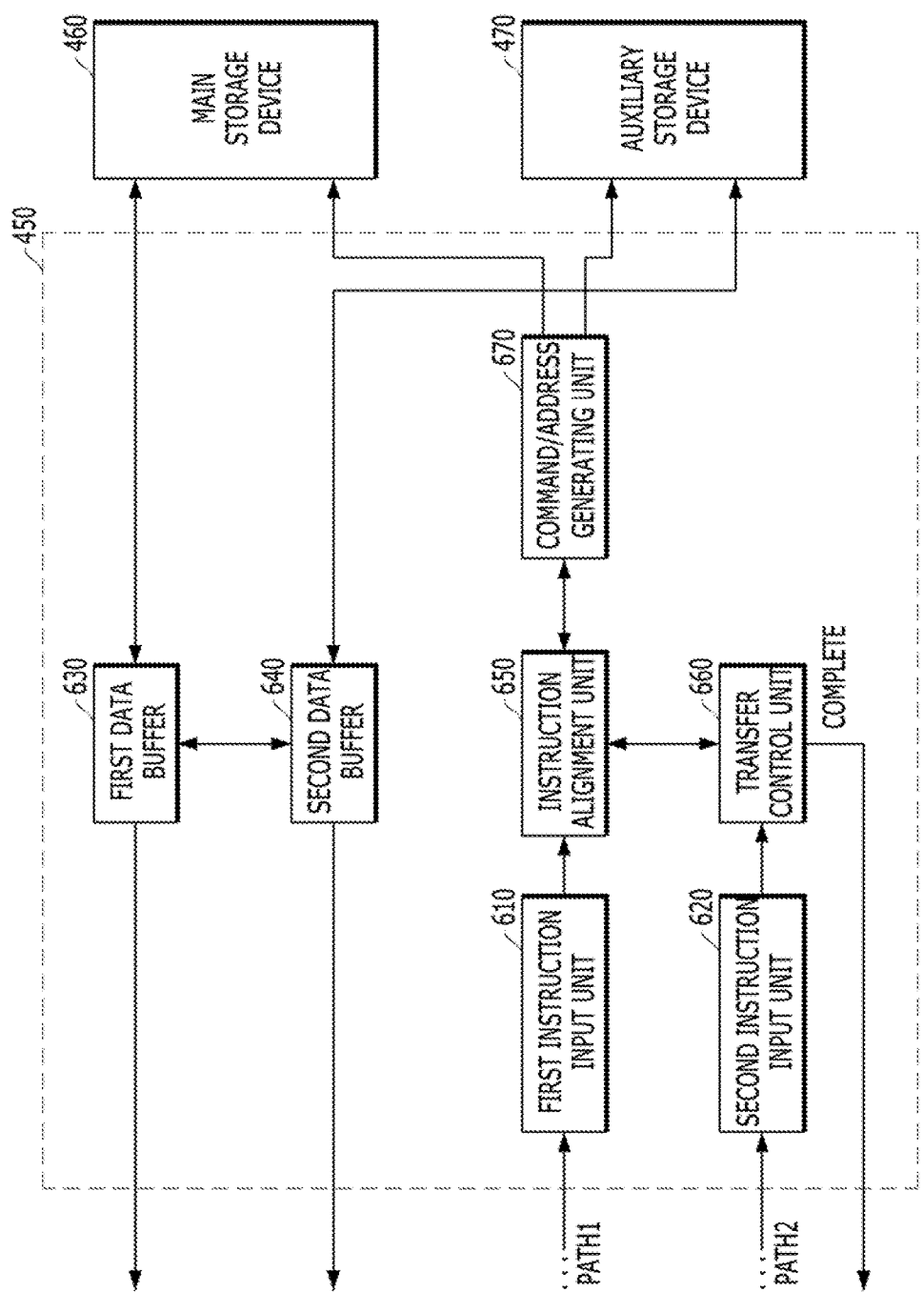
FIG. 6 is a block diagram illustrating a configuration of a memory controller shown in FIG. 4, according to an embodiment of the present invention.

FIG. 6 is a block diagram illustrating a configuration of the memory controller 450 of FIG. 4, according to an embodiment of the present invention.

According to the embodiment of FIG. 6, the memory controller 450 may include first and second instruction input units 610 and 620, first and second data buffers 630 and 640, an Instruction alignment unit 650, a transfer control unit 660, and a command/address generating unit 670.

The first instruction input unit 610 may receive one or more instructions which are transferred through a first path PATH1. When receiving two or more instructions, the first instruction input unit 610 may output the instructions in the order of being inputted, i.e., in a first in, first out order. The second instruction input unit 620 may receive one or more instructions which are transferred through a second path PATH2. When receiving two or more instructions, the second instruction input unit 620 may output the instructions in the order of being inputted, i.e., in a first in, first out order.

The first path PATH1 may be a path for transferring a required instruction and address when the CPU 410 directly accesses the main storage device 460. The second path PATH2 may be a path for transferring a required instruction and address when the CPU 410 accesses the auxiliary storage device 470. The memory controller 450 may perform a control task so that data is stored in the main storage device 460 or data stored in the main storage device 460 is outputted in response to an instruction transferred through the first path PATH1. The memory controller 450 may perform a control task so that data stored in the auxiliary storage device 470 is transferred and stored to and in the main storage device 460 or data stored in the main storage device 460 is transferred and stored to and in the auxiliary storage device 470 in response to an instruction transferred via the second path PATH2.

The first data buffer 630 may buffer data which is transferred between the main storage device 460 and an external device to the memory controller 450. The second data buffer 640 may buffer data which is transferred between the auxiliary storage device 470 and an external device to the memory controller 450. When data is transferred between the main storage device 460 and the auxiliary storage device 470, the data may be transferred between the first and second data buffers 630 and 640.

The instruction alignment unit 650 may align the Instructions inputted from the first instruction input unit 610 and the second instruction input unit 620, and output these instructions. The instruction alignment unit 650 may receive one or more instructions inputted through the first and second instruction input units 610 and 620, and, when it receives two or more instructions, it may output the instructions in the order of being inputted, i.e., in a first in, first out order.

The transfer control unit 660 may control an operation of transferring data from the auxiliary storage device 470 to the main storage device 460, when the instruction from the CPU 410 calling the data of the auxiliary storage device 470 is inputted through the second instruction input unit 620. When the instruction to call the data of the auxiliary storage device 470 is inputted to the transfer control unit 660, then the transfer control unit 660 may generate an instruction and an address to read out the data of the auxiliary storage device 470 and output them to the instruction alignment unit 650. Thereafter, the transfer control unit 660 may generate an Instruction and an address to write the read-out data from the auxiliary storage device 470, in the main storage device 460, into the instruction alignment unit 650.

Such control may be performed through one step, or alternatively may be performed through a number of steps. For example, after the data of the auxiliary memory device 470 is called, all of the called data may be read out from the auxiliary memory device 470 by a read instruction. Also, all of the read-out data may be written in the main storage device 460 by a write instruction. Alternatively, data may be transferred from the auxiliary storage device 470 to the main storage device 460, as an operation of reading out the data of the auxiliary storage device 470 and writing the read-out data in the main storage device 460 is iterated one or more times.

The command/address generating unit 670 may generate a command and an address in such a type that the main storage device 460 or the auxiliary storage device 470 may process the command and the address, in response to the command and the address outputted from the instruction alignment unit 650, and transfer them to the main storage device 460 or the auxiliary storage device 470.

Figure 7:
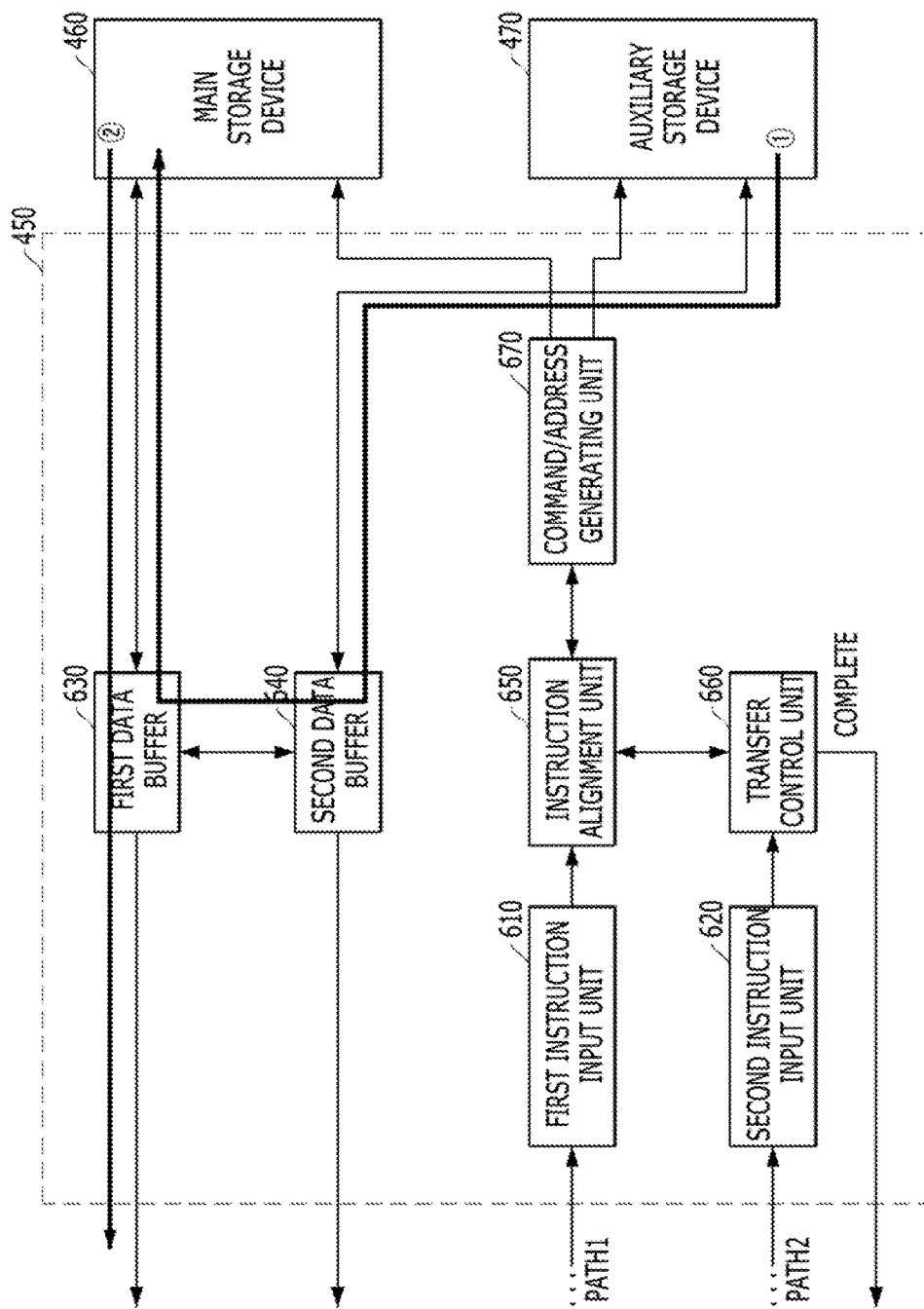
FIG. 7 is a block diagram illustrating a data transfer route in the memory controller of FIG. 6 when data of the auxiliary storage device is called by the CPU in the system of FIG. 4.

FIG. 7 is a block diagram illustrating a data transfer route in the memory controller 450 of FIG. 6 when the data of the auxiliary storage device 470 is called by the CPU 410 in the system of FIG. 4.

Referring to FIG. 7, when the data of the auxiliary storage device 470 is called by the CPU 410, an instruction to control an operation corresponding to the call may be inputted to the second instruction input unit 620 through the second path PATH2. The transfer control unit 660 may perform a control in response to the instruction inputted to the second instruction input unit 620 so that the data of the auxiliary storage device 470 is transferred to the main storage device 460. First, the transfer control unit 660 may generate a read instruction and an address for reading out the data located in a predetermined location of the auxiliary storage device 470 and output them to the instruction alignment unit 650. Next, the transfer control unit 660 may generate a write instruction and an address for writing the read-out data from the auxiliary storage device 470 to a predetermined location of the main storage device 460 and output them to the instruction alignment unit 650. In response to the sequential read and write instructions, the data may be read out from the auxiliary storage device 470 and the read-out data may be written to the main storage device 460 via the second data buffer 640 and the first data buffer 630 in this order (①).

When all the data called by the CPU 410 are transferred from the auxiliary device 470 to the main storage device 460 at one time, the above-described operation may be performed only once. However, when all the called data are transferred from the auxiliary device 470 to the main storage device 460 over N times, the above-described data transfer operation may be iterated N times under the control of the transfer control unit 660. When the data transfer operation from the auxiliary device 470 to the main storage device 460 is completed, the transfer control unit 660 may activate a completion signal COMPLETE.

The CPU 410 may detect that the data has been transferred from the auxiliary storage device 470 to the main storage device 460 through the completion signal COMPLETE which is sent from the memory controller 450. The CPU 410 may then access the main storage device 460 after the activation of the completion signal COMPLETE, and call the data which were transferred from the auxiliary storage device 470 to the main storage device 460 and are now stored therein (②).

Figure 8:
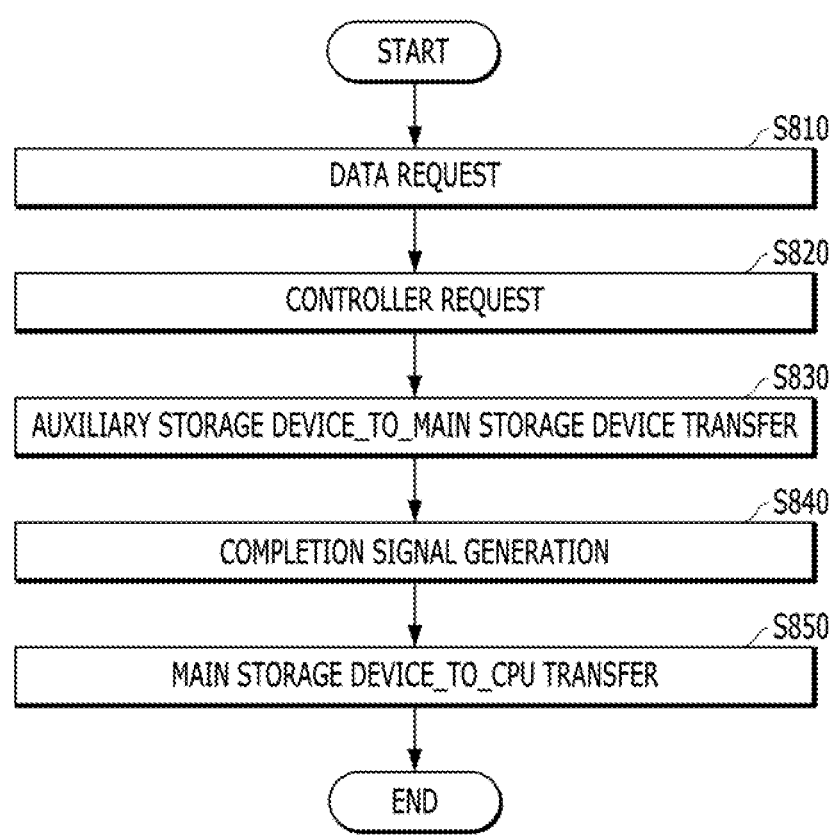
FIG. 8 is a flowchart illustrating a method of operating the system, according to an embodiment of the present invention.

FIG. 8 is a flowchart illustrating a method of operating the system according to an embodiment of the present Invention.

Referring to FIG. 8, the method of operating the system may include a data request step (S810), a controller request step (S820), an auxiliary storage device-to-main storage device transfer step (S830), a completion signal generation step (S840), and a main storage device-to-CPU transfer step (S850).

The data request step (S810) may represent a step that the CPU 410 transfers a data call instruction to the memory controller 450. The controller request step (S820) may represent a step that the memory controller 450 requests a data transfer to the transfer control unit 660 in response to the data call instruction. The auxiliary storage device-to-main storage device transfer step (S830) may represent a step that the data of the auxiliary storage device 470 is transferred to the main storage device 460 under the control of the transfer control unit 660.

The completion signal generation step (S840) may represent a step that the transfer control unit 660 notifies the CPU 410 that the data of the auxiliary storage device 470 which is requested by the CPU 410 is transferred to the main storage device 460. The main storage device-to-CPU transfer step (S850) may represent a step that the data of the main storage device 460 is transferred to the CPU 410 by the memory controller 450 via the memory bus 430.

Figure 3:
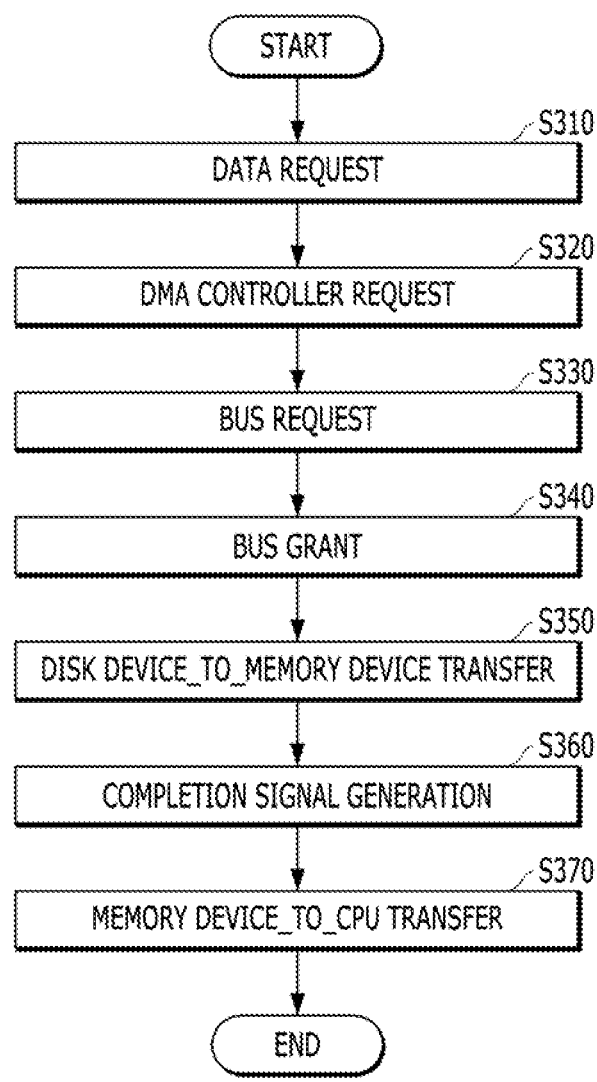
FIG. 3 is a flowchart illustrating a data transfer process of FIG. 2.

Referring to FIGS. 8 and 3, the system of FIG. 4 may transfer data from the auxiliary storage device 470 to the main storage device 460 in a more simplified process than that of the prior art illustrated in FIG. 1. For example, the system of FIG. 4 does not employ the buses 430 and 480 in transferring the data from the auxiliary storage device 470 to the main storage device 460.

Figure 9:
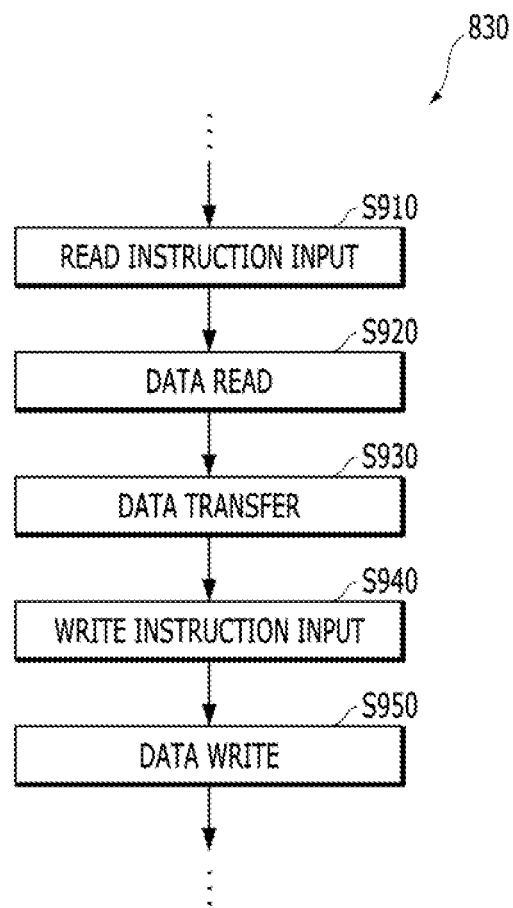
FIG. 9 is a flowchart illustrating a specific procedure of an auxiliary storage device-to-main storage device transfer step shown in FIG. 8.

FIG. 9 is a flowchart illustrating specific procedures performed in the auxiliary storage device-to-main storage device transfer step (S830) of FIG. 8.

Referring to FIG. 9, the auxiliary storage device-to-main storage device transfer step (S830) may include a read instruction input step (S910), a data read step (S920), a data transfer step (S930), a write instruction input step (S940), and a data write step (S950).

The read instruction input step (S910) may represent a step that the transfer control unit 660 generates the read instruction for reading out the data from the auxiliary storage device 470 and transfers it to the instruction alignment unit 650. The data read step (S920) may represent a step that the data is read out from the auxiliary storage device 470 in response to the read instruction outputted from the instruction alignment unit 650. The data transfer step (S930) may represent a step that the data read out from the auxiliary storage device 470 is transferred to the first data buffer 630 via the second data buffer 640. The write instruction input step (S940) may represent a step that the transfer control unit 660 generates the write instruction for writing the data in the main storage device 460 and inputs it to the instruction alignment unit 650. The data write step (S950) may represent a step that the data outputted from the first data buffer 630 is written in the main storage device 460 in response to the write instruction outputted from the instruction alignment unit 650.

As described in the above embodiments, since a memory system includes an auxiliary storage device coupled to a main storage device via a memory port, a memory controller may transfer data of the auxiliary storage device to the main storage device via the memory port, thereby quickly and simply transfer the data in response to a call from a CPU.

Although various embodiments have been described for illustrative purposes, it will be apparent to those skilled in the art that various changes and modifications may be made without departing from the spirit and scope of the invention as defined in the following claims.

What is claimed is:
1. A system comprising:
 a central processing unit (CPU);
 main and auxiliary storage devices coupled to a plurality of memory ports;
 a memory bus suitable for coupling the CPU and the plurality of memory ports; and
 a memory controller suitable for, when the CPU calls data stored in the auxiliary storage device, controlling the called data to be transferred from the auxiliary storage device to the main storage device and stored in the main storage device,
 wherein the memory controller comprises:
 a first instruction input unit suitable for receiving a first instruction to control the main storage device through a first path;
 a second instruction unit suitable for receiving a second instruction to control the auxiliary storage device through a second path; and
 an instruction alignment unit suitable for aligning and outputting the first instruction inputted to the first instruction input unit and the second instruction inputted to the second instruction input unit.

2. The system of claim 1, wherein the memory controller transfers a completion signal to the CPU when storage of the called data in the main storage device is completed.

3. The system of claim 1, wherein the CPU transfers the first instruction to the memory controller through the first path, and transfers the second instruction to the memory controller through the second path.

4. The system of claim 3,
 wherein the memory controller stores data in the main storage device or outputs data stored in the main storage device, in response to the first instruction transferred through the first path, and
 wherein the memory controller transfers and stores data stored in the auxiliary storage device to and in the main storage device or transfers and stores data stored in the main storage device to and in the auxiliary storage device, in response to the second instruction transferred through the second path.

5. The system of claim 3, wherein the memory controller further comprises:
 a data transfer control unit suitable for controlling data transfer between the main storage device and the auxiliary storage device;
 a first data buffer suitable for buffering data inputted to the main storage device or outputted from the main storage device; and
 a second data buffer suitable for buffering data inputted to the auxiliary storage device or outputted from the auxiliary storage device.

6. The system of claim 5, wherein, when data outputted from the auxiliary storage device is transferred to the main storage device, the data outputted from the auxiliary storage device is transferred to the main storage device through the second data buffer and the first data buffer in order, and, when data outputted from the main storage device is transferred to the auxiliary storage device, the data outputted from the main storage device is transferred to the auxiliary storage device through the first data buffer and the second data buffer in order.

7. The system of claim 3, wherein the memory controller further comprises:

a command/address generating unit suitable for generating a command and an address to control the main storage device and the auxiliary storage device in response to the first and second instructions transferred through the first and second paths.

8. The system of claim 1, wherein the main storage device comprises a volatile memory device which has an operating speed faster than the auxiliary storage device.

9. The system of claim 8, wherein the main storage device comprises one or more of a cache memory and a dynamic random access memory (DRAM).

10. The apparatus of claim 1, wherein the auxiliary storage device comprises a nonvolatile memory device which has an operating speed slower than the main storage device.

11. The system of claim 10, wherein the auxiliary storage device comprises a storage channel memory which is capable of being coupled to the memory ports.

12. The system of claim 11, wherein the I/O bus comprises one or more of a peripheral component interconnect (PCI) bus and a serial advanced technology attachment (SATA) bus.

13. The system of claim 1, further comprising:
a plurality of input/output (I/O) ports;
one or more peripheral devices coupled with the plurality of I/O ports;
an I/O bus coupled with the plurality of I/O ports; and
a bus controller suitable for controlling data transfer between the I/O bus and the memory bus.

14. A method for operating a system including a central processing unit (CPU), main and auxiliary storage devices coupled to a plurality of memory ports, and a memory controller controlling the main and auxiliary storage devices, the method comprising:
transferring an instruction to call data which is stored in the auxiliary storage device, by the CPU;
transferring and storing the called data of the auxiliary storage device to and in the main storage device, in response to the transferred instruction; and
transferring a completion signal to the CPU when the storing of the called data in the main storage device is completed,
wherein the transferring of the instruction comprises:
transferring, by the CPU, a first instruction to control the main storage device to the memory controller through a first path;
transferring, by the CPU, a second instruction to control the auxiliary storage device to the memory controller through a second path, and
aligning, by the memory controller, the first instruction and the second instruction to control the main storage device and the auxiliary storage device.

15. The method of claim 14, wherein the CPU and the main storage device communicate through a memory bus.

16. The method of claim 15, wherein the transferring and storing of the called data of the auxiliary storage device to and in the main storage device comprises:
generating a read command for the called data;
reading out the called data from the auxiliary storage device in response to the read command;
transferring data read out from the auxiliary storage device, to the main storage device;
generating a write command for data transferred to the main storage memory; and
writing the data transferred to the main storage device, in the main storage device in response to the write command.

17. The method of claim 14, wherein the main storage device comprises a volatile memory device which has an operating speed faster than the auxiliary storage device.

18. The method of claim 14, wherein the auxiliary storage device comprises a nonvolatile memory device which has an operating speed slower than main storage device.

19. A system comprising:
main and auxiliary storage devices; and
a memory controller coupled to the main and auxiliary storage device via a plurality of memory ports and suitable for reading and writing data from and to the main and auxiliary storage devices,
wherein when data stored in the auxiliary storage device is called, the memory controller controls the called data to be transferred from the auxiliary storage device to the main storage device via the memory ports and to be stored in the main storage device,
wherein the memory controller comprises:
a first instruction input unit suitable for receiving a first instruction to control the main storage device through a first path;
a second instruction unit suitable for receiving a second instruction to control the auxiliary storage device through a second path; and
an instruction alignment unit suitable for aligning and outputting the first instruction inputted to the first instruction input unit and the second instruction inputted to the second instruction input unit.

* * * * *